March 12, 1963 R. D. PIPER ETAL 3,081,237
DOUBLE-BAKED, SELF-CHANNELLING ELECTRODE
Filed Sept. 22, 1961
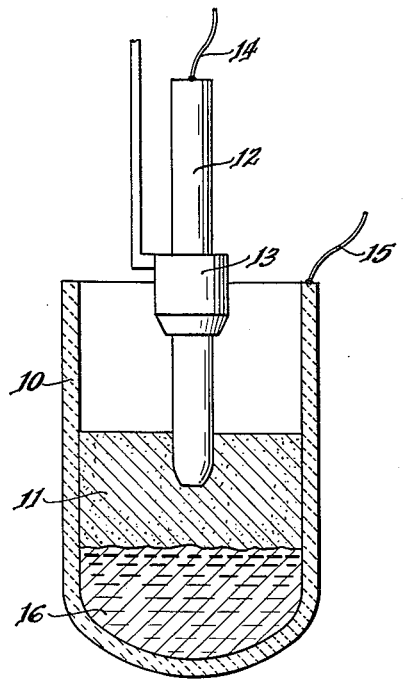
INVENTORS
Roger D. Piper
Robert F. Leifield
Attorney 3,081,237
DOUBLE-BAKED, SELF-CHANNELLING
ELECTRODE
Roger D. Piper, Des Peres, and Robert F. Leifield, St. Louis, Mo., assignors, by mesne assignments, to the United States of America as represented by the United States Atomic Energy Commission
Filed Sept. 22, 1961, Ser. No. 140,148
8 Claims. (Cl. 204—1.5)

The invention relates to a novel electrode material for use in electrolysis and to a method of making the same, more particularly to discrete electrodes and electrode components for use in the anode in the electrolysis of uranium oxides to produce uranium metal.

Up until the present, uranium metal has been mainly produced from uranium oxides by a two-step process in which the oxides are first converted to a halide intermediate, which is then reduced by a metal such as magnesium. Direct one-step reduction of the oxides to metal has many potential advantages, but so far no process of this kind has been devised which is entirely satisfactory.

Recently a process has been developed wherein the reduction to metal of uranium oxides mixed with carbon in stoichiometric proportions has been brought about electrolytically in a cell using a fused salt electrolyte. This process is described in a "Topical Report" numbered MCW-1447 and entitled "Electrodeposition of Uranium Oxides to Massive Uranium Metal," By R. D. Piper and R. F. Leifield, published on June 3, 1960, by Mallinckrodt Chemical Works, Weldon Spring, Mo., and available from the Office of Technical Services, Department of Commerce, Washington 25, D.C.

Certain shortcomings have been found to be inherent in the process referred to. The uranium oxide-carbon mixture has to be in the form of particles or pellets in order to present a sufficiently large surface to the electrolyte to carry the current needed to bring about the reduction. The pellets have to be supported in a perforated conductive container, usually of graphite and referred to as a basket anode; since the graphite is at a higher anodic potential than the pellets in the basket, it reacts with the $UF_4$ and other fluorides of the fused electrolyte such as $BaF_2$ and $LiF$ to form $CF_4$. This results in several disadvantages; the basket erodes rather quickly and requires frequent replacement, and more serious, the depletion of the $UF_4$ of the electrolyte adds greatly to the costs of the process.

Because of these deficiencies of the basket anodes, attempts were made to build a coherent, or as it is also called, a "bare" anode, of the uranium oxide-carbon stoichiometric mixture. Since a solid cylindrical electrode was known to have an insufficient interfacial area with the electrolyte, attempts were made to increase it by forming it into star-shapes and other such odd shapes, and by drilling holes into the anode parallel with its axis. Neither of these expedients met with much success; the odd-shaped electrodes were difficult to mold and subject to cracking, and the electrodes with holes drilled in them were also subject to cracking and expensive to fabricate due to the abrasive nature of the uranium oxide which wore out the drills rapidly.

In addition to these physical disadvantages, coherent or bare anodes showed a serious shortcoming of a chemical nature; when the stoichiometric amount of carbon needed to reduce the uranium oxide was used, a sooty deposit of carbon appeared over the surface in contact with the electrolyte shortly after the start of the electrolysis and suppressed the production of metal. Attempts were made to remedy this by reducing the carbon content of the electrode below stoichiometric proportions, but as soon as this was done uranium oxides escaped unreduced into the electrolyte. For some reason that is not entirely understood even slight oxide impurities in the electrolyte drastically affect the character of the metal produced; instead of massive metal something similar to shot results, and with undesirable metallurgical properties.

It is, accordingly, an object of the invention to provide a coherent uranium oxide-carbon anode for use in the direct electrolytic reduction of uranium oxides to uranium metal in a fused salt electrolyte, of adequate mechanical strength, and which will not either form a deposit of carbon on its surface or release oxides into the electrolyte during electrolysis.

It is a further object to provide a method for producing such an anode without molding into unusual shapes or drilling holes to increase the interfacial area between it and the electrolyte.

Other objects will appear as the description proceeds.

All the foregoing objects are attained by our discovery that if a uranium oxide-carbon mixture with less than the stoichiometric amount of carbon required to reduce the oxide to metal is formed into pellets and baked, the resulting ceramic pellets then crushed preferably into predominantly non-spherical shape, preferably of larger particle size than the original uranium oxide particles, and mixed with additional carbon, the mixture may then be formed into satisfactory discrete electrodes. The additional carbon should be enough to make the total carbon content of the electrodes stoichiometrically sufficient to reduce the uranium oxides to the metallic state, or even somewhat in excess of the stoichiometric, and the resulting second mixture may then be formed into simple coherent anode shapes such as round rods, square rods and the like and baked to give anodes with the desired qualities outlined in the foregoing objects of the invention.

We have given our anodes, for purposes of convenience, the name of double-baked, channel-forming anodes, or electrodes, because of the two bakings necessary to produce them, and the fact that the crushed ceramic pellets resulting from the first baking, containing less than the stoichiometric amount of carbon required for the electrolytic reduction of the oxides, appear to have a channel-forming property within the finished anode. The channels formed, however, do not penetrate deeply into the anode due to the fact that the particles are of limited size, and embedded in a binder, or matrix, of carbon that stops channel formation at the limits of the embedded particles and thereby keeps the channels close to the surface. For this reason the anode wears away during the electrolysis evenly or nearly so, so that it can be fed into the electrolyte in a continuous manner.

For convenience we will hereafter call the ceramic produced by the first baking the channel-forming ceramic.

In addition to forming channels and thereby providing the interfacial area with the electrolyte needed for current passage, the channel-forming ceramic also suppresses the formation of the sooty carbon deposit mentioned that interferes with the desired electrolytic reduction, and, as above stated, this is true even when the carbon content of the electrodes somewhat exceeds stoichiometric proportions.

It has been suggested that this is due to an increased chemical activity attributable to a local galvanic effect at the common interface between the channel-forming ceramic, the carbon matrix, and the electrolyte, but whatever the true explanation, a harmful carbon deposit does not accumulate on our electrode. Our invention is offered, of course, not on the basis of any theory such as the above, but empirically, on the basis of findings from actual experiments. And with its stoichiometrically adequate amount of carbon, or even an excess, our electrode does not release uranium oxides into the electrolyte to contaminate it, possibly because of the same increased chemical activity at the three-way interface above mentioned.

We have found our anode material is capable of being used in still another way in addition to forming it into discrete anode shapes. It may be used in pellet form, either by molding it into such form before the second baking, or by breaking larger shapes of twice-baked material into pellet size. In either case the pellets may then be placed in a conventional graphite basket anode of the general type described in the "Topical Report" mentioned in the third paragraph of this specification. The use of such pellets greatly reduces the rate of erosion of the basket, by suppressing the formation of $CF_4$.

Hence, our electrode material may be used either as a discrete electrode or as an electrode component.

Reference is now made to the drawings, FIG. 1 of which is a simplified sectional view showing the electrolytic cell in which our novel anode is used.

FIG. 2 is a drawing of the structure of our novel anode in cross-section, showing the predominantly non-spherical character of the particles of the channel-forming ceramic.

FIG. 3 is a flow-sheet of the process for making our novel anode.

Referring to FIG. 1, 10 is a graphite crucible comprising the container for the cell proper, it being understood that the entire apparatus is surrounded by a protective shell to keep noxious fumes from leaking to the atmosphere, but since this is not a part of the invention, it is not shown. Crucible 10 also acts as the cathode. 11 is the fused salt electrolyte such as one or a mixture of the fluorides of uranium, barium, lithium, and the like. 12 is our novel anode which is fed into the electrolyte 11 by clutch means 13, which may be activated manually or by a solenoid as is known in the art. 14 and 15 are wires carrying direct electric current to anode 12 and from cathode 10 respectively. 16 is the pool of molten uranium which collects as it is formed at the bottom of crucible 10.

Referring to FIG. 2, the anode 12, in cross-section, is seen to consist of a carbon binder 18, which holds the predominantly non-spherical particles 19 of crushed pellets of the channel-forming ceramic together in a coherent shape.

Certain details of carrying out our invention are critical within limits. The weight ratio of uranium oxide to carbon in the channel-forming ceramic will, of course, depend on the particular uranium oxide used; since $UO_2$ is the most commonly used the proportions will be discussed with regard to $UO_2$, it being understood that if other oxides such as $U_3O_8$ are used, appropriate adjustments should be made.

When the anode is a mixture of $UO_2$ and carbon, carbon monoxide is produced at the anode within the efficiently operating voltage range of 5 to 12 volts, from which it is fair to conclude that the following reaction takes place:

$$UO_2 + 2C \rightarrow U + 2CO$$

The stoichiometric amount of carbon required for this reaction is

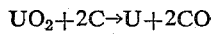

$$\frac{24.02}{294.11}$$

or about 8.2 percent by weight of the mixture. This assumes that the reaction is carried out within the voltage range of about 5 to 12 volts; above or below this, the reaction is les efficient, although above it the stoichiometric amount of carbon is somewhat less than 8.2 due to evolution of $CO_2$ at the anode rather than CO.

In preparing for the first baking, the proportions of carbon should be considerably less than the stoichiometric, anywhere from 50 to 75 percent thereof, which is equivalent to from about 4.1 to about 6.15 weight percent carbon, and the balance $UO_2$, all percentages being of the mixture. We prefer a mixture having carbon 65 percent of the stoichiometric, or, for the voltage conditions above set forth where the stoichiometric percentage is about 8.2, about 5.33 weight percent carbon and about 94.67 weight percent $UO_2$. The carbon may be from coal tar pitch, petroleum pitch, or any similar predominantly carboniferous adhesive material which on baking will lose its volatile components and leave a residue of substantially pure carbon that will act as a binder. Coal tar pitch is preferred. Allowance should be made, of course, for the carbonization value of the particular pitch or other adhesive material used; an excess should be used in order to give, after the volatilization, a carbon residue of the percentages set forth.

The uranium oxide particles should be screened and only the particles which pass through a 100 mesh screen should be used.

The carbon and the uranium dioxide particles should be intermixed and then baked in a reducing atmosphere in an oven at between about 1100° and about 1200° C., for from about 1 to 6 hours during which time the volatile components of the pitch will disappear leaving only substantially pure carbon as a binder, or, as it might also be called, a matrix, although it is present in a minor amount. We prefer 1100° C. for 3 hours.

The resulting channel-forming ceramic should then be crushed, preferably in a device which will produce predominantly non-spherical particles such as a jaw crusher. The non-spherical character of the particles is preferable since predominantly spherical particles, such as those produced in a ball mill, would tend to form a denser mass.

The particles should be fine enough to pass through a screen of about 20 mesh. Fines which pass through a screen of 100 mesh should be rejected. Thus, the channel-forming ceramic particles are larger than the original uranium dioxide particles.

The resulting screened particles should then be mixed with additional carbon, which, again, may be coal tar pitch, petroleum pitch, or any similar predominantly carbon-containing substance which, on baking, will lose its volatile components and leave a residue of substantially pure carbon which will act as a binder. Coal tar pitch is again preferred. As above explained, the channel-forming ceramic already contains from about 50 to about 75 percent of the stoichiometric amount needed to reduce the uranium oxide to metal; the carbon of the binder residue should supplement this to at least equal the stoichiometric amount of carbon needed for the reduction and even exceed it somewhat; in other words, it should be from about 25 to about 53.66 percent of the stoichiometric amount. This is equivalent to the binder being from about 2.05 to about 4.40 weight percent of the weight of the entire electrode. We prefer to have the binder carbon constitute about 40 weight percent of the stoichiometric amount, or about 3.28 weight percent of the electrode.

The total preferred carbon content of the whole electrode is from about 8.2 to 8.5 weight percent, which is equivalent to from 100 to about 103.66 percent of the stoichiometric amount of carbon required to reduce $UO_2$ to metal as explained above.

The resulting mixture is thoroughly blended in a blending device such as a kneader, at a temperature above the softening point of the pitch, molded into discrete electrode shapes such as cylindrical and square rods, and then baked at from about 1100° to 1200° C., for from 1 to 6 hours. We prefer a cylindrical rod electrode such as that shown in FIGS. 1 and 2, baked at about 1100° C. for 3 hours.

Alternately, the mixture may be molded into pellets, baked in the same way, and used in a basket-type anode.

*Example 1*

Two thousand grams of $UO_2$ of —100 mesh particle size were mixed with 180 grams of coal tar pitch (100° C. softening point) having a carbonization, or coking, value of about 65 percent by weight, pressed at 1000 p.s.i. pressure and 110° C. into approximately cylindrical pellets having an average diameter of 2½ inches, packed with graphite powder and baked at 1100° C. for 3 hours. The resulting ceramic pellets were crushed in a jaw crusher. The crushed pellets were passed through a screen of 20 mesh, the larger pieces not passing through were rejected, and then the fines removed by passing them through a screen of 100 mesh, the fines from the latter being also rejected.

The resulting −20 +100 mesh particles weighing 1400 grams were mixed with 70 grams of the same coal tar pitch, pressed at 2000 p.s.i. and 110° C. into cylindrical rods 2½ inches in diameter and 2½ inches long. These were packed in graphite powder and baked at 1100° C. for 3 hours.

Runs in a cell of the type illustrated in FIG. 1 were made using the double-baked electrode of the invention, and other runs using a single-baked type of electrode wherein all the ingredients are mixed at one time and baked but once. The cell was 4 inches in diameter and the anodes were in all cases cylindrical in shape, 2½ inches in diameter. The cathode was the wall of the containing vessel, of graphite. The electrolyte was a fused mixture of 65 percent $BaF_2$, 10 percent $LiF$ and 25 percent $UF_4$. The voltage of the cell during all runs was 5.5 volts of direct current.

With the single-baked anodes the rate of deposition of metallic uranium was 0.5 gram per minute, a current efficiency of 19 percent. With the double-baked anode of the invention, at the same voltage and with all other conditions the same, the rate of uranium deposition averaged 0.7 gram per minute and went as high as 1.2 grams per minute with a current efficiency of 22 percent.

Following the runs the anodes were examined. The anodes of the invention were found to have worn away more evenly than the single-baked anodes, thereby making possible automatic lowering into the electrolyte as it is consumed. The single-baked anodes had a continuous carbon layer on their surfaces, whereas in the anodes of the invention this layer was dispersed in the interstitial spaces of the channels between the relatively large granules of binder carbon.

*Example II*

1400 grams of the −20+100 mesh particles of Example I were mixed with 70 grams of the same coal tar pitch and pressed into cylindrical pellets and given a "second baking" at 1100° C. for 3 hours. The double-baked pellets were placed in a basket anode of the general type described in the "Topical Report" mentioned in the third paragraph of this specification and the basket anode was placed within a cell of the type described in the Topical Report. The electrolyte in this cell was the same as the electrolyte of the cell described in Example I above; the voltage and all other conditions were also the same.

After making a run of the cell in which uranium metal was produced, another run was made under identical conditions except that pellets of the single-baked type were in the basket anode.

The results of the two runs were as follows:

| Run | Current Efficiency, percent | Basket Erosion, mm./hr. | Basket Erosion, mm./kg.U |
| --- | --- | --- | --- |
| With Double-baked Pellets | 48 | 0.04 | 0.2 |
| With Single-baked Pellets | 42 | 0.4 | 0.7 |

It will be understood that this invention is not to be limited to the details given herein but that it may be modified within the scope of the appended claims.

What is claimed is:

1. A method of making an electrode component comprising intermixing a uranium oxide with carbon, baking the two together to make a ceramic, crushing the ceramic to discrete particles mixing the discrete particles with carbon, molding the resulting mixture into a shape, and baking the shape.

2. A method of making an electrode component comprising intermixing a uranium oxide with a predominantly carboniferous adhesive material which, on heating, will lose its volatile components and leave a residue of substantially pure carbon, the carbon of the residue being present in less than the stoichiometric amount required to reduce the uranium oxide to metal, baking the two together to form a channel-forming ceramic, crushing the channel-forming ceramic to discrete particles, screening the discrete particles, mixing the discrete particles with a predominantly carboniferous adhesive material, molding the resulting mixture into shapes, and baking the shapes.

3. The method of claim 2 where the predominantly carboniferous adhesive material is pitch.

4. The method of claim 3 where the pitch is coal tar pitch.

5. The method of claim 3 where the uranium oxide and the adhesive material are baked at between about 1100° and about 1200° C. in a reducing atmosphere for from about 1 to about 6 hours.

6. The method of claim 1 where the particle size of the crushed ceramic is greater than the particle size of the uranium oxide.

7. The method of claim 1 where the particle size of the crushed ceramic is −20+100, and the particle size of the uranium oxide is −100 mesh.

8. The product of the process of claim 1.

References Cited in the file of this patent

MCW–1447 Electroreduction of Uranium Oxides to Massive Uranium Metal, Apr. 25, 1960; by R. D. Piper et al.; available from Office of Technical Sources, Dept. of Commerce, pp. 6 and 7.